July 18, 1944.

C. H. PRIEST, JR 2,353,757

DRILLING APPARATUS

Filed Nov. 4, 1941

INVENTOR
Charles H. Priest, Jr.
BY John Flam
ATTORNEY

Patented July 18, 1944

2,353,757

UNITED STATES PATENT OFFICE 2,353,757

DRILLING APPARATUS

Charles H. Priest, Jr., Pasadena, Calif.

Application November 4, 1941, Serial No. 417,789

10 Claims. (Cl. 77—62)

This invention relates to apparatus for drilling apertures in objects, such as the heads of bolts or screws. This application is a continuation in part of an application filed on March 24, 1941, under Serial Number 384,838, in the name of Charles H. Priest Jr., and entitled "Drilling apparatus."

In that application, an apparatus is described for firmly holding a screw or bolt in a position where it may be advanced and retracted with respect to a rotating drill, so as to cause the drill to penetrate the head of the bolt in a direction transverse to the axis of the bolt or screw. There is described, in connection with that apparatus, a clamping device for the screw or bolt that is automatically actuated to clamping and releasing position in response to the advance and retraction of the carriage that supports the work. An ejector mechanism is also described, operating to force the work out of the carriage when the carriage is moved to retracted position.

Since the aperture to be drilled is often of very small diameter, it is desirable to provide a guiding aperture for the drill to prevent lateral deflection thereof. This guiding aperture is made to conform to the diameter of the aperture to be drilled; and the support for the shank of the work is made to conform to the size of the diameter of the shank. Accordingly provisions are made in the apparatus described in said prior application for making it possible to replace the drill guide and the shank support.

It is also necessary to predetermine the axial position of the aperture to be drilled with respect to the head; for example so that the aperture extends through the head but below the screw driver slot in the head. Of course for different sized screws, this may and often does require a nice adjustment of the axial position of the head with respect to the drill.

It is one of the objects of this invention generally to improve the work holder or jig, and particularly by making it possible to obtain the desired adjustments mentioned hereinabove.

It has been found that the walls of the guiding aperture for the drill are subject to some wear upon continued drilling operations, making it essential periodically to renew the drill guide. It is another object of this invention to facilitate such renewals.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing.

Figure 1:
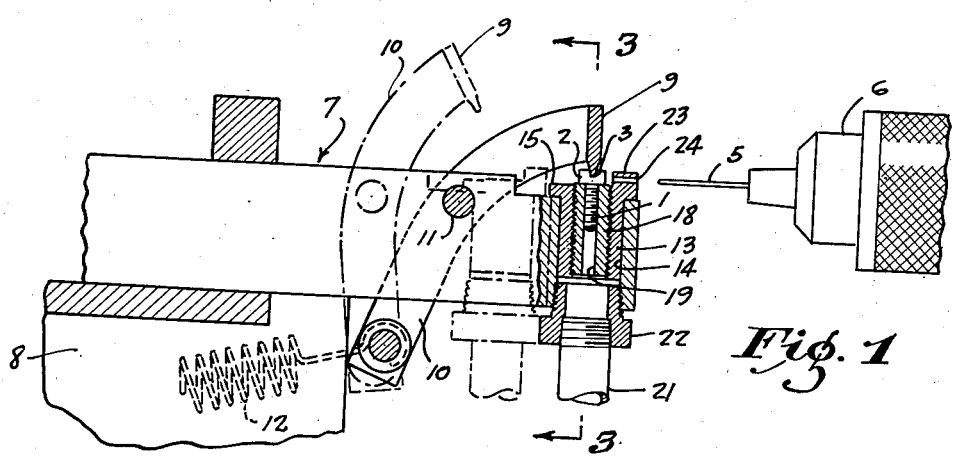
Figure 1 is a fragmentary side elevation, partly in section, of the drilling machine embodying the invention.
Figure 2:
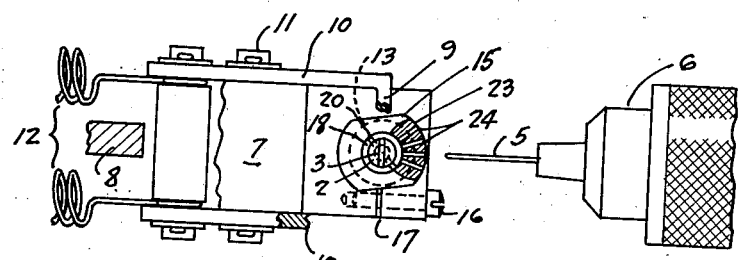
Fig. 2 is a top plan view thereof.
Figure 5:
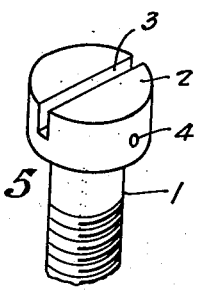
Fig. 5 is a screw or bolt upon which the drilling operation has been performed.

The bolt or screw 1 upon which the drilling operation is to be performed is shown as having a cylindrical head 2 with a transverse screw driver slot 3 therein (Fig. 5). Beneath the bottom of the slot 3 and transversely of the head 2 a drilled hole 4 is indicated, performed by the aid of a rotary drill 5 (Figs. 1 and 2). This drill 5 is shown as held in a chuck 6 rotated by an appropriate source of power (not shown).

Figure 3:
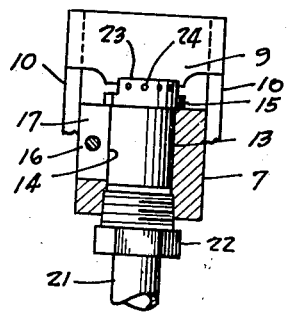
Fig. 3 is a sectional view taken along plane 3—3 of Fig. 1.

In order to perform the drilling operation, use is made of a carriage 7 in which the screw 1 is held during the drilling operation. This carriage 7 is movable, as explained in the prior application hereinabove referred to, in a direction toward and from the drill 5. It is guided appropriately for this movement by a guiding frame 8 indicated in Fig. 1. In the position illustrated in Figs. 1 and 2, the carriage 7 has been moved sufficiently toward the right so as to cause automatic engagement of the clamping blade 9 (Figs. 1, 2 and 3) with the screw driver slot 3 of the head 2. This clamping blade 9 as in the previous application is shown as carried by the arms 10 extending on either side of the carriage 7 and pivotally mounted thereon as by the aid of the pin 11. As before, one or more tension springs 12 are applied to the depending ends of the arms 10, urging the arms 10 toward clamping position.

As the carriage 7 continues to move toward the right, the drill 5 penetrates the head 2 and forms a drilled aperture 4. Upon retraction of the carriage 7 the clamping blade 9 is caused to move to the retracted position illustrated in dotted lines in Fig. 1, and the screw 1 is free to be ejected from its holder.

The holding means for the screw 1 is in the form of a jig. This jig is located in the right hand end of the carriage 7 and is so arranged that the axis of the screw 1 is substantially vertical. The holding means or jig is illustrated as comprising a cylindrical body 13 located in a vertical aperture 14 (Fig. 3) in the carriage 7. The body 13 is provided with a flange 15 resting upon the top surface of the carriage 7. The cylindrical body 13 may be held in clamped position by the aid of the clamping screw 16 (Figs. 2 and 3) which passes across a split or slot 17 extending from the aperture 14 to the side of the carriage 7.

To form a rest for the head 2 of the screw 1, use is made of a member 18 externally threaded and engaging a longitudinal threaded aperture in the body 13. This member 18 is provided with a guide aperture 19 coaxial with the body 13 into which the shank of the screw 1 may be accommodated. The top of the member 18 is in contact with the head 2 and serves as an abutment against which the clamping blade 9 may act.

Figure 4:
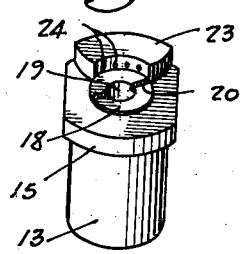
Fig. 4 is an isometric view of the drilling jig utilized in connection with the drilling machine.

In order to make it possible to adjust the height of the head 2 when it is in the clamped position of Fig. 1, the member 18 may be axially adjusted within the threaded aperture in the body 13 to the desired extent, by a screw threading rotation. For facilitating the axial adjustment of the member 18 the top of this member may be provided with the screw driver slot 20 (Figs. 2 and 4).

The aperture 19 is in communication with a compressed air conduit 21 connected in the bottom of the carriage 7 as by the aid of the coupling nut 22. As described in the prior application, after the clamping blade 9 is retracted in the motion of the carriage 7 toward the left, a valve is opened to pass compressed air through the conduit 21. The air acts to eject the released screw 1 out of the apparatus. All this has been described in the said prior application and further description herein is unnecessary.

Since the drill 5 is usually of very small diameter, and since it is arranged to be urged against the cylindrical head 2, it is necessary that a guiding aperture be provided therefor. In the present instance the guiding aperture is formed in the integrally formed extension 23 extending from the flange 15. This extension 23 projects upwardly and is in the form of an arc. Several guiding apertures 24 are provided, and any one of them may be optionally used. For this purpose, the axes of all of these apertures 24 intersect upon the axis of the aperture 19. In the event that one guiding aperture is worn by continued projection of the drill 5 therethrough, the clamping screw 16 may be loosened and the jig body 13 angularly adjusted to align a new aperture 24 in appropriate position for guiding the drill 5 transversely of the head 2.

By providing a number of members 18 with different sized apertures 19 therethrough, different sized screw shanks may be accommodated. Furthermore, by axial adjustment of the member 18, the proper position of the drilled aperture 4 with respect to the head 2 can be set.

Preferably the entire jig is made of tool steel so that it may be appropriately hardened.

What is claimed is:

1. In a jig for an object to be drilled, a hollow body having a longitudinal axis, as well as a drill guiding passage transverse to the axis, and an axially adjustable member in said body, having a surface serving as a rest for the object, as well as an aperture coaxial with said axis for accommodating a portion of said object.

2. In a jig for an object to be drilled, a body having a threaded longitudinal aperture therein, as well as a drill guiding passage transverse to the axis, and a threaded member in said longitudinal aperture, said threaded member having an aperture coaxial with the threaded aperture, for accommodating a portion of said object, as well as a surface on one end serving as a rest for the object.

3. In a drill jig for a headed screw, a hollow body having a longitudinal axis, as well as a drill guiding passage transverse to the axis, and an axially adjustable hollow member in said body for accommodating the shank of the screw, and providing an end surface serving as a rest for the head of the screw.

4. In a drill jig for a headed screw, a body having a threaded longitudinal aperture therein, as well as a drill guiding passage transverse to the axis, and a member in threaded engagement with the aperture, said member having a longitudinal aperture for the accommodation of the shank of the screw, as well as an end surface serving as a rest for the head of the screw.

5. A drill jig for guiding a drill in a direction transverse to the head of a screw, a cylindrical body for supporting the screw, and having a longitudinal axis, and an extension on the body having a plurality of guiding apertures having axes intersecting at the axis of the body.

6. In a jig for an object to be drilled, a hollow body having a longitudinal axis, an axially adjustable member in said body, having a surface serving as a rest for the object, as well as an aperture coaxial with said axis for accommodating a portion of said object, and an extension formed on the body, having a plurality of guiding apertures with axes intersecting at the axis of the body.

7. In a jig for an object to be drilled, a body having a threaded longitudinal aperture therein, a threaded member in said longitudinal aperture, said threaded member having an aperture coaxial with the threaded aperture, for accommodating a portion of said object, as well as a surface on one end serving as a rest for the object, and an extension formed on the body, having a plurality of guiding apertures with axes intersecting at the axis of the body.

8. In a drill jig for a headed screw, a hollow body having a longitudinal axis, an axially adjustable hollow member in said body for accommodating the shank of the screw, and providing an end surface serving as a rest for the head of the screw, and an extension formed on the body, having a plurality of guiding apertures with axes intersecting at the axis of the body.

9. In a drill jig for a headed screw, a body having a threaded longitudinal aperture therein, a member in threaded engagement with the aperture, said member having a longitudinal aperture for the accommodation of the shank of the screw, as well as an end surface serving as a rest for the head of the screw, and an extension formed on the body, having a plurality of guiding apertures with axes intersecting at the axis of the body.

10. A drill jig for guiding a drill in a direction transverse to the head of a screw, a cylindrical hollow body for accommodating the shank of the screw, a flange at one end of the body and providing a supporting shoulder therefor, and an arcuate extension projecting from the flange in a direction parallel to the axis of the body, said extension having a plurality of guiding apertures having axes intersecting at the axis of the body.

CHARLES H. PRIEST, Jr.